United States Patent
Cymbal

[11] Patent Number: 5,366,316
[45] Date of Patent: Nov. 22, 1994

[54] INTERMEDIATE STEERING SHAFT ASSEMBLY AND METHOD

[75] Inventor: William D. Cymbal, Freeland, Mich.

[73] Assignee: General Motors Corporation, Detroit, Mich.

[21] Appl. No.: 155,344

[22] Filed: Nov. 19, 1993

Related U.S. Application Data

[63] Continuation of Ser. No. 892,835, Jun. 2, 1992, abandoned.

[51] Int. Cl.⁵ .......................... B62D 1/00; F16B 3/00
[52] U.S. Cl. .................................. 403/378; 403/377; 403/359; 74/490
[58] Field of Search ............... 403/359, 383, 377, 378, 403/379, 344, 390; 280/777; 74/490

[56] References Cited

U.S. PATENT DOCUMENTS

| | | | |
|---|---|---|---|
| 2,948,559 | 8/1960 | Recker | 403/359 |
| 3,867,050 | 2/1975 | Pitner | 403/383 |
| 3,923,409 | 12/1975 | Stoner . | |
| 4,509,775 | 4/1985 | Arndt . | |
| 4,552,544 | 11/1985 | Beckman | 403/359 |
| 4,628,758 | 12/1986 | Yuzuriha | 403/359 |
| 4,899,611 | 2/1990 | Pinna . | |
| 4,921,367 | 5/1990 | Everett | 403/379 |
| 4,938,094 | 7/1990 | Cochard | 74/492 |
| 5,002,422 | 3/1991 | Schremmer | 403/359 |

OTHER PUBLICATIONS

Universal Joint Layout & Selection Data Book–Rockwell Inc.–Troy, Mich.

Primary Examiner—Randolph A. Reese
Assistant Examiner—Anthony Knight
Attorney, Agent, or Firm—Saul Schwartz

[57] ABSTRACT

An intermediate steering shaft assembly for a motor vehicle includes a "counter phased" Cardan joint in the assembly. The "counter phased" Cardan joint includes forming an outer yoke of the Cardan joint with a yoke portion and a separate yoke shaft portion. The yoke portion is connected by a bearing spider to an inner "phased" yoke of the Cardan joint mounted on an end of an intermediate steering shaft and has a center position corresponding to a center position of the intermediate shaft. A connection is formed on the yoke shaft portion so that the latter is mounted on a steering shaft with a unique center position corresponding to the center position of the steering shaft. A splined bore is formed on the yoke portion and a splined end is formed on the yoke shaft portion so that the yoke shaft portion is connectable to the yoke portion in any of a plurality of relative angular positions. The yoke shaft portion in its center position is then connected to the yoke portion in its center position through the splined bore and splined end.

5 Claims, 2 Drawing Sheets 5,366,316

INTERMEDIATE STEERING SHAFT ASSEMBLY AND METHOD

This is a continuation of application Ser. No. 07/892835 filed on Jun. 2, 1992, now abandoned.

FIELD OF THE INVENTION

This invention relates to intermediate steering shaft assemblies for motor vehicles.

BACKGROUND OF THE INVENTION

In many motor vehicles, an intermediate steering shaft assembly connects a steering shaft to a steering gear input shaft. Such assemblies usually include an intermediate shaft and two simple universal joints, commonly called Cardan joints. Each Cardan joint includes an inner yoke mounted on the intermediate shaft and an outer yoke attached to the inner yoke through a bearing spider and mounted on a corresponding one of the steering shaft and the steering gear input shaft. The Cardan joints are "phased" to achieve about 1:1 angular velocity ratio between the steering shaft and the steering gear input shaft.

As described in a publication entitled "universal Joint Layout and Selection Data Book", published by Rockwell International Corporation, Troy, Mich. 48084, Cardan joints at opposite ends of a connecting shaft, e.g. an intermediate steering shaft, are "phased" when the yokes mounted on opposite ends of the shaft are simultaneously in their true joint planes. In intermediate steering shaft applications, however, where the steering shaft and the steering gear input shaft must also be centered at the same time, it is necessary to "counter phase" one end of the shaft assembly to maintain the required positional relationship between the steering shaft and the steering gear input shaft. In the past, "counter phasing" of one end of the intermediate steering shaft assembly has been achieved by simply making the steering shaft to fit the outer yoke. However, because different vehicle models usually dictate different true joint planes for the Cardan joints, this method of "counter phasing" requires the manufacture and inventory of many different steering shafts, thereby increasing manufacturing cost.

SUMMARY OF THE INVENTION

This invention is a new and improved "phased" and "counter phased" intermediate steering shaft assembly including an intermediate shaft, a first Cardan joint at a first end of the shaft adapted for attachment to a steering gear input shaft, and a second Cardan joint at a second end of the intermediate shaft adapted for attachment to a steering shaft. The first and second Cardan joints are "phased" by orienting an inner yoke of each joint, mounted on the first and second ends of the intermediate shaft, in respective ones of the true joint planes of the first and second Cardan joints. One of the first and second Cardan joints is "counter phased" by adapting an outer yoke thereof for universal angular adjustability relative to the outer yoke of the other of the first and second Cardan joints, by providing a splined bore in a yoke portion of the outer yoke which receives a splined end of a yoke shaft portion of the outer yoke in any of a plurality of angular positions and by providing a driving connection on the yoke shaft portion for attachment to the corresponding one of the steering gear input shaft and the steering shaft.

DESCRIPTION OF REPRESENTATIVE PRIOR ART

Figure 1:
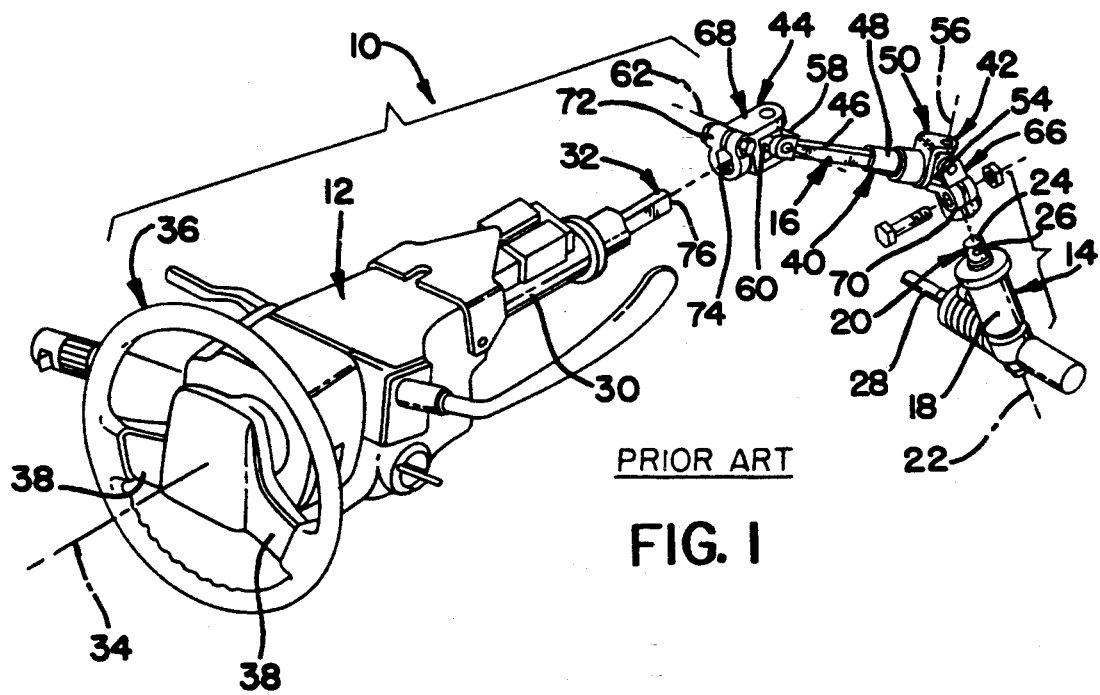
FIG. 1 is a fragmentary, exploded perspective view of a prior art automotive steering system including a "phased" and "counter phased" intermediate steering shaft assembly.
Figure 2:
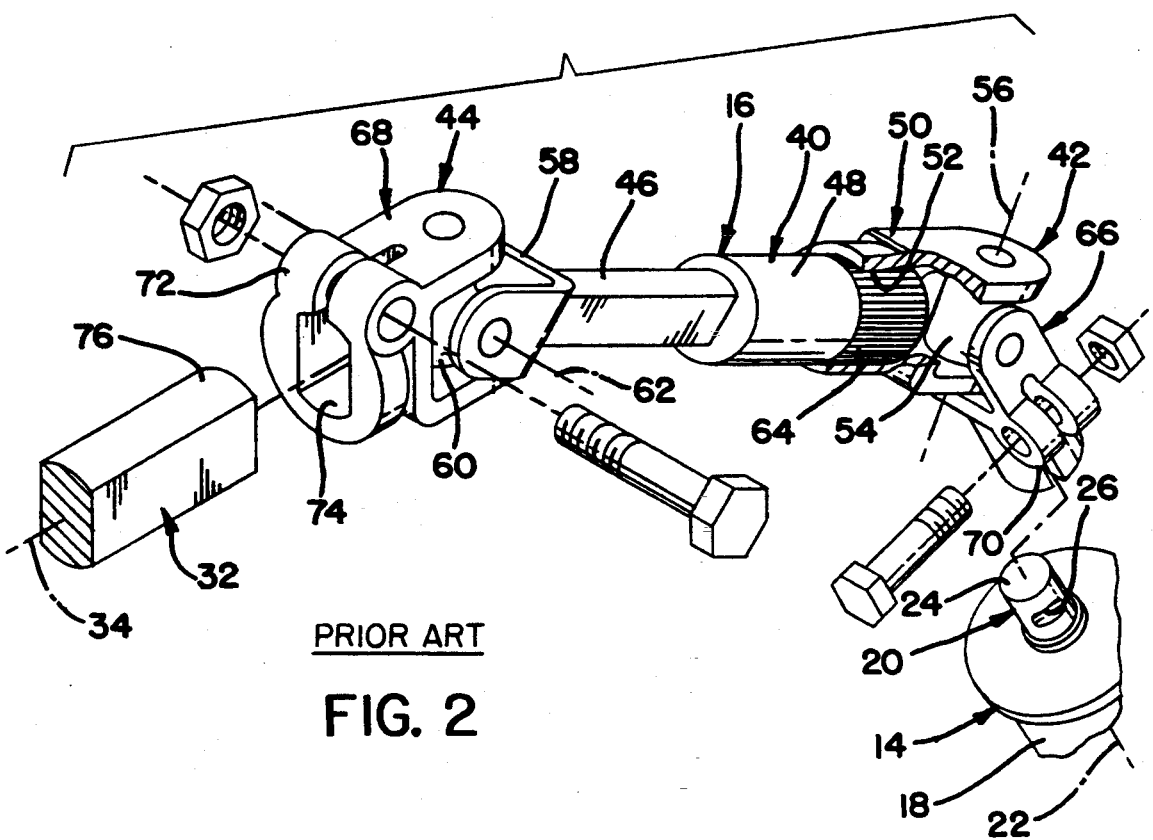
FIG. 2 is an enlarged perspective view of a portion of FIG. 1.

Referring to FIGS. 1 and 2, a representative prior art motor vehicle steering system (10) includes a steering column (12), a rack and pinion steering gear (14), and an intermediate steering shaft assembly (16). The steering gear (14) includes a housing (18) and an input shaft (20) supported on the housing for rotation about an axis (22) of the steering gear. The input shaft has a distal end (24) and a notch (26) near the distal end. A steering rack (28) is supported on the housing for bodily shiftable movement in known fashion in response to rotation of the input shaft. A pair of tie rods, not shown, are articulated to opposite ends of the steering rack and to a pair of front wheels, not shown, of the vehicle. The input shaft has a center position corresponding to straight ahead orientation of the front wheels.

The steering column (12) includes a mast jacket (30), a steering shaft (32) supported on the mast jacket for rotation about an axis (34) of the column, and a steering wheel (36) rigidly attached to an upper end of the steering shaft. The steering shaft (32) has a center position characterized, for example, by symmetric orientation of a pair of spokes (38) of the steering wheel relative to a longitudinal centerplane of the steering column and corresponding to straight ahead driving.

The intermediate steering shaft assembly (16) includes a two-piece intermediate shaft (40), a first Cardan joint (42), and a second Cardan joint (44). The intermediate shaft (40) has a non-circular inner shaft portion (46) telescoped inside a tubular, correspondingly non-circular outer shaft portion (48). The inner and outer shaft portions are telescopically adjustable in the length direction and rotatable as a unit.

The first Cardan joint (42) includes an inner yoke (50) having a splined bore (52) therein and a pair of spaced apart bearing support arms at which the inner yoke is connected to a bearing spider (54) for relative rotation about an axis (56) of of the inner yoke. The second Cardan joint (44) likewise includes an inner yoke (58) having a pair of spaced apart bearing support arms at which the inner yoke is connected to a bearing spider (60) for relative rotation about an axis (62) of the inner yoke (58). The inner yoke (58) is mounted on the inner shaft portion (46) by welding or the like for rotation as a unit therewith. A splined end (64) of the outer shaft portion (48) is received in the splined bore (52) in the inner yoke (50) whereby the inner yoke (50) is mounted on the intermediate shaft for rotation as a unit therewith.

The first and second Cardan joints are "phased" by orienting the axes (56,62), respectively, in the true joint planes of the first and second Cardan joints (42,44). The true joint planes are unique to each particular vehicle model and depend upon the relative angles and spacing between steering shaft (32) and the steering gear input shaft (20). Any selected angular interval or "phase" may be achieved by correspondingly orienting the inner yoke (50) before engaging the splined end (64) of the outer shaft portion (48) in the splined bore (52). Thereafter, the inner yoke (50) is retained on the outer shaft portion (48) by flaring, expanding, or staking the splined end of the latter behind the splined bore (52).

The first Cardan joint (42) further includes an outer yoke (66) having a pair of arms at which the outer yoke is connected to the bearing spider (54) for relative rotation. The second Cardan joint (44) likewise further includes an outer yoke (68) having a pair of arms at which the outer yoke is connected to the bearing spider (60) for relative rotation. The outer yoke (66) has an integral clamp (70) adapted to fit over the distal end (24) of the steering gear input shaft (20). The outer yoke (68) likewise has an integral clamp (72) defining a non-circular opening (74) adapted to receive a correspondingly shaped end (76) of the steering shaft (32).

By virtue of the notch (26), the integral clamp (70) and the outer yoke (66) of the first Cardan joint (42) have a predetermined angular relationship to the steering gear input shaft. The "phased" relationship between the first and second Cardan joints, then, dictates the orientation of the non-circular opening (74) in the integral clamp (72) when the steering gear input shaft (20) is in its center position. Since the center position of the steering shaft (32) is independent of the center position of the steering gear input shaft (20), "counter phasing" is required in order for the steering shaft end (76) to fit in the opening (74) when both the steering shaft and the steering gear input shaft are in their center positions.

In the steering system (10), "counter phasing" is achieved by simply manufacturing the steering shaft (32) with a non-circular end (76) oriented to fit the opening (74) in the outer yoke (68) when both the steering shaft and the steering gear input shaft are in their respective center positions. For different vehicle applications, this method of "counter phasing" requires manufacture of different steering shafts, i.e. steering shafts having non-circular ends at different angular positions relative to the center position of the steering shaft.

DESCRIPTION OF PREFERRED EMBODIMENTS OF THE INVENTION

Figure 3:
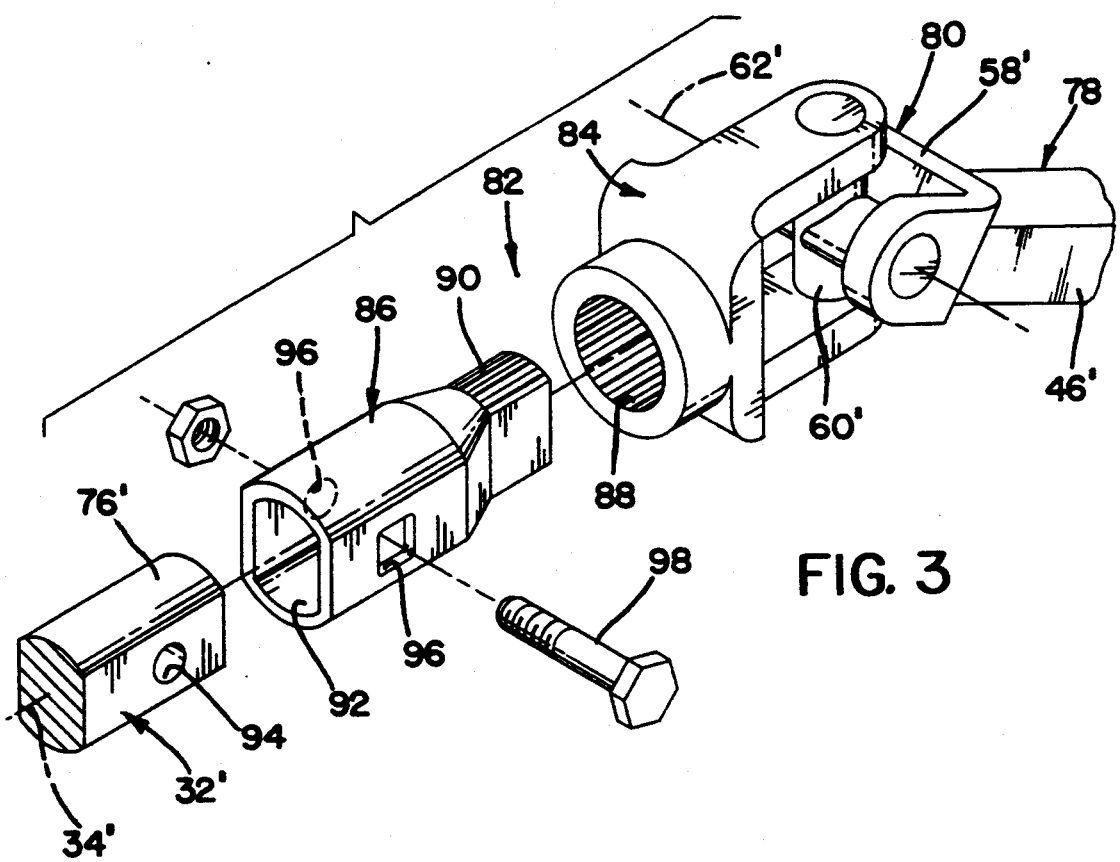
FIG. 3 is an exploded perspective view of a portion of a "phased" and "counter phased" intermediate steering shaft assembly according to this invention.

Referring to FIG. 3, an intermediate steering shaft assembly (78) according to this invention is identical to the prior art intermediate steering shaft assembly (16) except as described below. In FIG. 3, elements common to both assemblies (16,78) are identified by primed reference characters.

The intermediate steering shaft assembly (78) includes a second Cardan joint (80) at the end of the inner shaft portion (46') of the intermediate shaft. The second Cardan joint includes an inner yoke (58') having a pair of spaced apart bearing support arms at which the inner yoke is connected to a bearing spider (60') for relative rotation about an axis (62') of the inner yoke (58'). The inner yoke (58') is mounted on the inner shaft portion (46') by welding or the like for rotation as a unit therewith.

The second Cardan joint further includes two-piece outer yoke (82) having a yoke portion (84) and a separate, tubular yoke shaft portion (86). The yoke portion (84) has a splined bore (88) and a pair of spaced apart bearing support arms at which the yoke portion (84) is connected to the bearing spider (60') for relative rotation. The yoke shaft portion (86) has splined end (90) adapted for reception in the splined bore (88) in any of a plurality of angular positions relative to the yoke portion. The yoke shaft portion (86) is retained on the yoke portion by flaring, expanding, or staking the end of the yoke shaft portion behind the splined bore (88).

The yoke shaft portion (86) also has a non-circular socket end (92) having an internal shape corresponding to the shape of the end (76') of the steering shaft (32') and adapted to receive the end (76') in telescopic fashion. When the shaft end (76') is disposed in the socket end (92), a through bore (94) in the shaft end (76') registers with a pair of holes (96) in the yoke shaft portion. A retaining bolt (98) through the holes (96) and the bore (94) retains the yoke shaft portion (86) on the steering shaft end (76').

The intermediate shaft and the first Cardan joint of the intermediate steering shaft assembly (78) are made in accordance with the foregoing physical descriptions of those elements in the representative steering system illustrated in FIGS. 1 and 2. The inner yokes of the first and second Cardan joints are "phased" and are mounted on the corresponding ends of the intermediate shaft as described above.

The non-circular end (76') of the steering shaft (32') is assumed to be in an arbitrary but known angular position when the steering shaft is in its center position. The second Cardan joint (80) is "counter phased" by indexing the yoke shaft portion (86) relative to the yoke portion (84) to a predetermined angular position calculated to angularly align the non-circular end (76') with the socket end (92) when the steering shaft (32') and the steering gear input shaft are each in their center positions. Then, the splined end (90) of the yoke shaft portion (86) is engaged in the splined bore (88) in the yoke portion (84) to capture the predetermined angular relationship between the two. The end of the yoke shaft portion is then expanded behind the splined bore (88) to retain the shaft portion on the yoke portion. When the intermediate shaft assembly is thereafter installed between the input and steering shafts, a velocity ratio of about 1:1 is achieved as a result of the aforesaid "phasing" and the steering shaft end (76') fits in the socket end (92) as a result of the aforesaid "counter phasing".

An intermediate shaft assembly according to this invention affords advantages over the prior art because a manufacturer can achieve many different intermediate shaft assemblies with a minimum number of different, standard component elements. For example, with intermediate shaft assemblies having different "phasing" angles, "counter phasing" as practiced in the prior art requires physically different steering shafts. With an intermediate shaft assembly according to this invention, "counter phasing" is achieved with only one standard steering shaft having an arbitrarily angularly located non-circular end and with standard yoke and yoke shaft portions which are simply assembled in different angular relationships to achieve different "counter phasing" angles.

Figure 4:
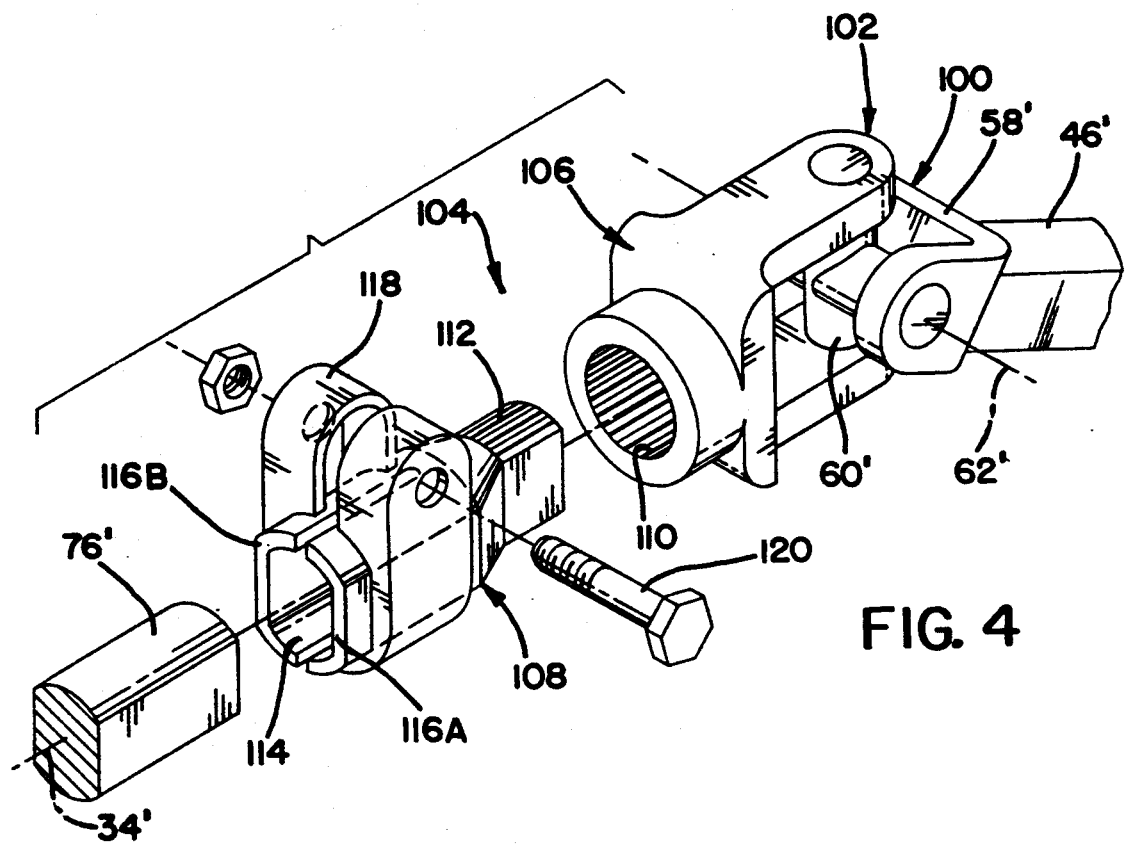
FIG. 4 is similar to FIG. 3 but showing a modified "phased" and "counter phased" intermediate steering shaft assembly according to this invention.

A modified intermediate steering shaft assembly (100) according to this invention is illustrated in FIG. 4 and is identical to the prior art intermediate steering shaft assembly (16) assembly except as described below. In FIG. 4, elements common to both assemblies (16,100) are identified by primed reference characters.

The intermediate steering shaft assembly (100) includes a second Cardan joint (102) at the distal end of the inner shaft portion (46') of the intermediate shaft. The second Cardan joint includes an inner yoke (58') having a pair of spaced apart bearing support arms at which the inner yoke is connected to a bearing spider (60') for relative rotation about an axis (62'). The inner yoke (58') is mounted on the inner shaft portion (46') by welding or the like for rotation as a unit therewith.

The second Cardan joint further includes an outer yoke (104) having a yoke portion (106) and a separate, tubular yoke shaft portion (108). The yoke portion (106) has a splined bore (110) and a pair of spaced apart bearing support arms at which the yoke portion is connected to the bearing spider (60') for relative rotation. The yoke shaft portion (108) has a splined end (112) adapted for reception in the splined bore (110) in any of a plurality of angular positions relative to the yoke portion. The yoke shaft portion (108) is retained on the yoke portion by flaring, expanding, or staking the end of the yoke shaft portion behind the splined bore (110).

The yoke shaft portion (108) also has a non-circular socket end (114) having an internal shape corresponding to the shape of the steering shaft end (76') and adapted to receive the steering shaft end in telescopic fashion. The socket end (114) is longitudinally split to define a pair of flexible sides (116A–B). A clamp (118) is disposed around the socket end (114) and actuated by a bolt/nut assembly (120) extending through ears of the clamp. When the shaft end (76') is disposed in the socket end (114) and the bolt/nut assembly (120) tightened, the shaft end (76') is clamped between the flexible sides (116A–B) for retention of the yoke shaft portion (108) on the steering shaft.

I claim:

1. An intermediate steering shaft assembly in a motor vehicle including a steering gear input shaft having a straight-ahead center position and a steering shaft having a straight-ahead center position comprising:
    means defining a plug-in end on said steering gear input shaft having a unique angular position in said straight-ahead center position of said steering gear input shaft,
    means defining a plug-in end on said steering shaft having a unique angular position in said straight-ahead center position of said steering shaft,
    an intermediate steering shaft,
    a "phased" first Cardan joint having an inner yoke mounted on a first end of said intermediate steering shaft in the true joint plane of said first Cardan joint and an outer yoke connected to said inner yoke through a bearing spider,
    a "phased" second Cardan joint having an inner yoke mounted on a second end of said intermediate steering shaft in the true joint plane of said second Cardan joint and an outer yoke including a yoke portion connected to said inner yoke of said second Cardan joint through a bearing spider,
    means defining a socket in said outer yoke of said first Cardan joint for reception of said plug-in end on one of said steering gear input shaft and said steering shaft whereby a unique center position of said intermediate steering shaft is defined corresponding to said straight-ahead center position of said one of said steering gear input shaft and said steering shaft and the unique angular position of said plug-in end thereon,
    a yoke shaft portion having a socket in a first end thereof for reception of said plug-in end on the other of said steering gear input shaft and said steering shaft when said socket has an angular orientation matching the angular orientation of said plug-in end on said other of said steering gear input shaft and said steering shaft, and
    means on said yoke portion and on said yoke shaft portion at a second end thereof operative to effect a driving connection between said yoke portion and said yoke shaft portion in any of a plurality of relative angular positions therebetween including a relative angular position in which the angular orientation of said socket in said yoke shaft portion matches said angular orientation of said plug-in end on said other of said steering gear input shaft and said steering shaft when said intermediate steering shaft is in said unique center position and said other of said steering gear input shaft and said steering shaft is in said straight-ahead center position.

2. The intermediate steering shaft assembly recited in claim 1 wherein said means on said yoke portion and on said yoke shaft portion at a second end thereof operative to effect a driving connection between said yoke portion and said yoke shaft portion in any of a plurality of relative angular positions therebetween includes:
    means on said yoke portion defining a bore having a plurality of inside splines therein, and
    means on said yoke shaft portion at said second end thereof defining a plurality of outside splines adapted for reception in said inside splines.

3. The intermediate steering shaft assembly recited in claim 2 wherein
    said socket in said outer yoke of said first Cardan joint receives said plug-in end on said steering gear input shaft, and
    said socket in said yoke shaft portion receives said plug-in end on said steering shaft.

4. The intermediate steering shaft assembly recited in claim 3 further including:
    means on said yoke shaft portion defining a pair of retaining bolt holes on opposite sides of said socket in said yoke shaft portion,
    means on said steering shaft defining a bore therethrough aligned with said retaining bolt holes in said yoke shaft portion when said plug-in end of said steering shaft is received in said socket in said yoke shaft portion, and
    a retaining bolt extending through said bore and said aligned bolt holes to retain said plug-in end of said steering shaft in said socket in said yoke shaft portion.

5. The intermediate steering shaft assembly recited in claim 3 further including:
    means on said yoke shaft portion defining a pair of flexible sides on opposite sides of said socket in said yoke shaft portion; and
    a clamp disposed around said flexible sides operative to clamp said flexible sides against said plug-in end of said steering shaft to retain said plug-in end of said steering shaft in said socket in said yoke shaft portion.

* * * * *